C. GERBEN.
AUTOMOBILE LOCK.
APPLICATION FILED APR. 9, 1920.
1,354,963.  Patented Oct. 5, 1920.
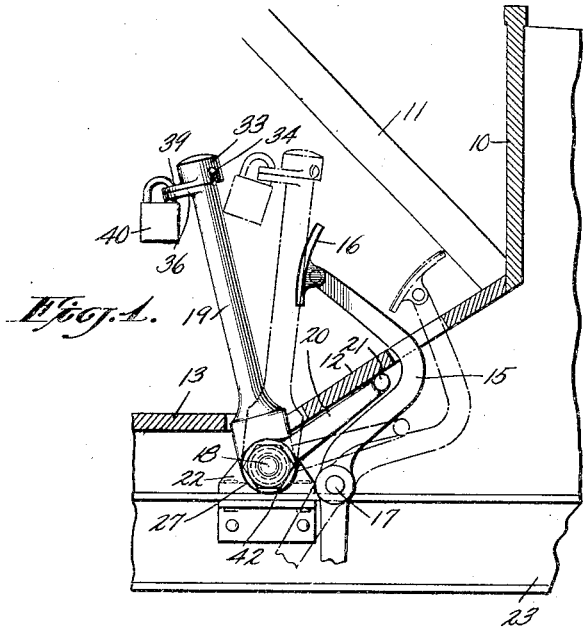
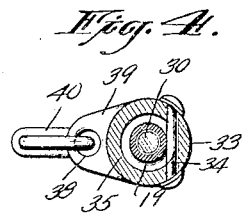
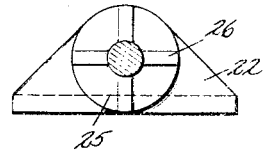
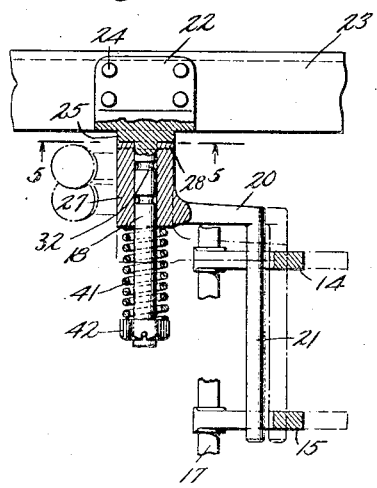
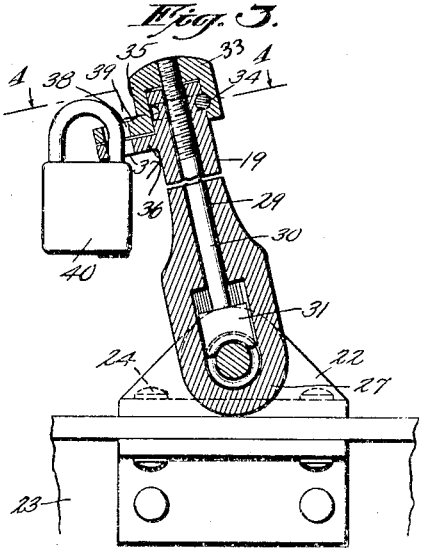
WITNESSES
INVENTOR
CHARLES GERBEN,
BY
ATTORNEYS

UNITED STATES PATENT OFFICE.

CHARLES GERBEN, OF NEW YORK, N. Y.

AUTOMOBILE-LOCK.

1,354,963.  Specification of Letters Patent.  Patented Oct. 5, 1920.

Application filed April 9, 1920. Serial No. 372,457.

*To all whom it may concern:*

Be it known that I, CHARLES GERBEN, a citizen of the United States, and a resident of the city of New York, borough of Bronx, county and State of New York, have invented a new and Improved Automobile-Lock, of which the following is a full, clear, and exact description.

This invention relates to automobile locks, and has reference more particularly to an automobile lock in which the device is adapted to lock the clutch and brake pedal in a predetermined position.

An object of this invention is to provide an automobile lock which will lock the foot pedals of an automobile in an extreme position so that the clutch will be disengaged and the brake will be engaged.

Another object of this invention is to provide an automobile lock which will absolutely prevent the theft of an automobile provided with this device.

Reference is to be had to the accompanying drawing forming a part of this specification, in which it is understood that the drawing illustrates only one form of the invention, and in which—

Figure 1 is a fragmentary sectional view through the foot board of an automobile showing my improved lock in position.

Fig. 2 is a plan view of the automobile lock with parts broken away to disclose the construction.

Fig. 3 is a central sectional view through the automobile lock.

Fig. 4 is a section through the automobile lock on the line 4—4 of Fig. 3.

Fig. 5 is a section through the automobile lock on the line 5—5 of Fig. 2.

Referring to the accompanying drawing by numerals 10, indicates the dash-board of an automobile which also is provided with a steering post 11, a foot board 12, and a bottom 13. Most automobiles are provided with a foot brake lever 14 and a foot clutch lever 15, each of which is provided with a foot pedal 16. The two levers are fulcrumed on a shaft 17 about which they are moved to the position shown in dotted lines in Fig. 1, when it is desired to stop the motion of the car, said movement of the levers serving to disengage the clutch and to throw on the brake. In order to lock the levers 14 and 15 in the position shown in dotted lines in Fig. 1, I provide a bell crank lever pivoted on a spindle 18 and having a lever arm 19 which is adapted to be rocked by the hand of the chauffeur, and an arm 20 positioned below the foot board 12, said arm 20 being provided with an offset arm 21 parallel to the spindle 18 which is adapted to engage both of the levers 14 and 15. The spindle 18 is secured to a bracket 22 which is secured to any part of the automobile such as frame work 23 by means of rivets 24. An annular shoulder 25 is formed on the bracket 22 at one end of the spindle 18, and a plurality of radial clutch recesses 26 are formed on the face of this shoulder. The end of the lever 19 pivoted to the spindle 18 is formed into a collar 27 fitted to said spindle, and provided on the end adjacent the shoulder 25 with a plurality of radial clutch teeth 28 adapted to engage the recesses 26 in one position so as to prevent the rotation of said lever 19. A co-axial hole 29 is provided in the lever 19 into which is rotatably and slidably mounted a rod 30 provided on one end with a dog 31 adapted to engage one of a plurality of annular grooves 32 formed in the spindle 18 so that when said dog engages an annular groove adjacent the shoulder 25, the teeth 28 engage the recesses 26 so as to prevent the rotation of the lever 19, while when said dog engages an annular groove opposite the shoulder 25, the teeth 28 will be disengaged from the recesses 26 so that said lever 19 may be moved about the spindle 18.

In order to reciprocate the rod 30 in the lever 19 so that the dog 31 may be engaged or disengaged from one of the annular grooves 32, a cap 33 is rotatably fitted to the end of the lever 19 opposite the spindle 18, and the end of the rod 30 adjacent this cap is threaded to be received by said cap. The cap 33 is rotatably retained on the end of the lever 19 by means of a chordally extending rivet 34 extending through said cap 33 and engaging an annular groove 35 formed on the end of said lever 19. An outstanding ear 36 is formed on the lever 19 which is provided with a hole 37 which registers with a hole 38 formed in an outstanding ear 39 secured to the cap 33 when said cap is in one position. A padlock 40 of any suitable construction engages the holes 37 and 38 of the ears 36 and 39 so that the cap 33 cannot be rotated by an unauthorized person for the purpose of stealing the automobile. The collar 27 is normally pressed inwardly so that the teeth 28 will be engaged by the recesses 26 by means of a coil spring 41 mounted on the spindle 18 which is held in place by means of a lock nut 42.

In operation the lever 19 normally is positioned as shown in full lines in Fig. 1, and the collar 27 is pressed inwardly so that the clutch teeth 28 engage the clutch recesses 26 on the shoulder 25, by the spring 41 so that said lever remains in this position. When in said position, the arm 21 will be disengaged from the levers 14 and 15 so that said levers may be operated by the feet of the chauffeur in operating the automobile. However, when it is desired to lock the automobile, the padlock 40 is removed from the ears 36 and 39, the collar 27 is moved axially on the spindle 18 so that the clutch teeth 28 are disengaged from the recesses 26; the lever 19 is then moved so that the arm 21 causes the levers 14 and 15 to be moved to an extreme position as shown in dotted lines in Fig. 1, the collar 27 is moved axially on the spindle 18 by means of the spring 41 until the teeth 28 again engage the recesses 26. The cap 33 is now rotated so that the threaded rod 30 is moved axially in the lever 19 thus causing the dog 31 to engage the annular groove 32 adjacent the shoulder 25, and the ears 36 and 39 are then locked together by means of the padlock 40. Thus in the locked position, the collar 27 cannot be moved axially on the spindle 18 due to the engagement of the dog 31 with an annular groove 32 so that the levers 14 and 15 remain in the position as shown in dotted lines in Fig. 1, so that the clutch is disengaged and the brake is thrown on, in which position the engine may be started but it cannot be connected with the driving mechanism; neither can the car be moved due to the brake.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In an automobile lock, a bell crank lever pivotally mounted adjacent the brake and clutch foot levers of an automobile, means for moving said lever about its pivot so that the brake and clutch levers are moved to an extreme predetermined position, and means for locking said bell crank lever in the latter position so that said clutch and brake lever are secured in said extreme position.

2. In an automobile lock, a lever pivotally mounted adjacent the brake and clutch foot levers of an automobile, means for moving said pivotally mounted lever about its pivot so that the brake and clutch levers are moved to an extreme predetermined position, and means for locking said lever in the latter position so that said clutch and brake lever are secured in said extreme position.

3. In an automobile lock, a bell crank lever pivoted adjacent the clutch and brake foot levers of an automobile, a clutch element associated with said bell crank lever adapted to secure said bell crank lever in a plurality of positions, and means for locking said clutch element so that one arm of said bell crank lever maintains the clutch and brake levers in a predetermined extreme position.

4. In an automobile lock, a spindle secured to said automobile, a bell crank lever pivotally and slidably mounted on said spindle, a clutch element associated with said bell crank lever and said spindle, and means for locking said clutch element so that one arm of said bell crank lever maintains the brake and foot levers in a predetermined extreme position.

5. A device as described in claim 4 characterized by a locking element slidably and rotatably mounted in an arm of said bell crank lever, means for reciprocating said locking element in said arm, and locking means adapted to lock said locking element in a predetermined position with respect to the arm of said bell crank lever.

CHARLES GERBEN.